No. 707,731. Patented Aug. 26, 1902.
E. A. G. STREET.
ELECTRIC BATTERY.
(Application filed Apr. 22, 1902.)

(No Model.)

ated August 26, 1902.
UNITED STATES PATENT OFFICE.

ERNEST AUGUSTE GEORGE STREET, OF PARIS, FRANCE, ASSIGNOR TO SOCIÉTÉ ANONYME LE CARBONE, OF LEVALLOIS-PERRET, NEAR PARIS, FRANCE.

ELECTRIC BATTERY.

SPECIFICATION forming part of Letters Patent No. 707,731, dated August 26, 1902.

Application filed April 22, 1902. Serial No. 104,194. (No model.)

*To all whom it may concern:*

Be it known that I, ERNEST AUGUSTE GEORGE STREET, electrician, a citizen of the Republic of France, residing at 56 Rue de Londres, Paris, in the Republic of France, have invented certain new and useful Improvements in or Relating to Electric Cells or Batteries, of which the following is a specification.

This invention has reference to electric cells or batteries, and has for its object to enable the depolarizing agent to be quickly and readily renewed without the said operation injuring or unduly interfering with the electrode in conjunction with which said depolarizing agent is employed. According to the said invention I may provide for the reception of said depolarizing agent a porous or perforated receptacle or chamber having its walls constructed of the same or a similar material as that constituting the electrode in conjunction with which it is to be used, and I provide simple means whereby after charging the said vessel or chamber it can be readily attached to the said electrode and again readily removed therefrom when requiring to be recharged. The terminal of the electrode is not mounted on said detachable vessel, but is connected to the electrode itself, and therefore remains undisturbed during the attachment or detachment of said vessel to or from the electrode.

In order that the said invention may be clearly understood and readily carried into effect, I will now describe the same more particularly with reference to the accompanying drawings, in which—

Figure 1:
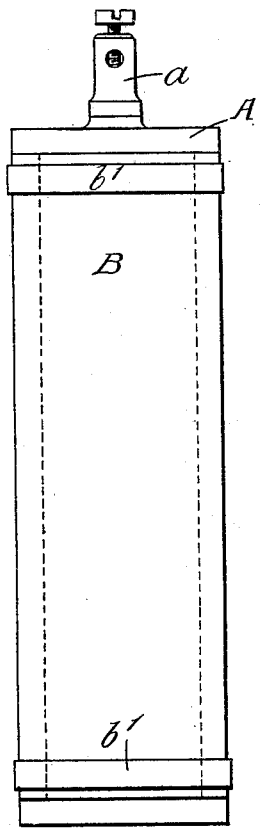
Figure 2:
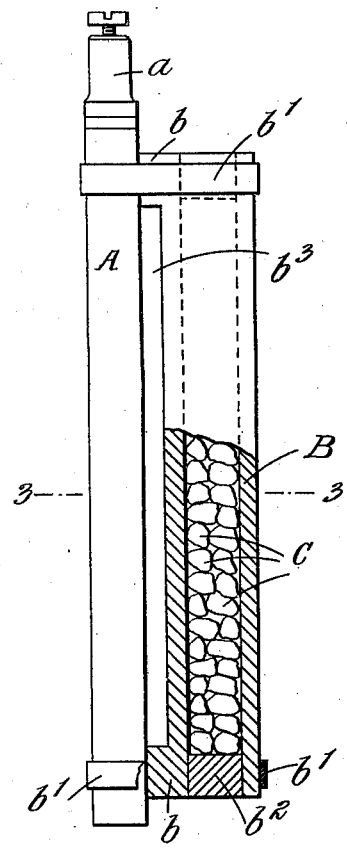
Figure 3:
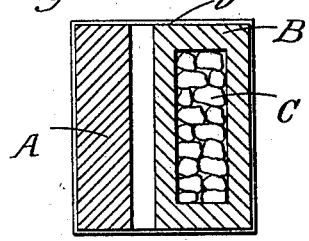

Figure 1 is a front elevation of a carbon electrode and receptacle or chamber for depolarizing agent; Fig. 2, a sectional side elevation of the same, and Fig. 3 is a section taken approximately on the line 3 3 of Fig. 2.

A is the electrode, B the aforesaid receptacle or chamber, and C the depolarizing agent or material contained therein.

The electrode A is of the ordinary or well-known kind and is furnished with terminal $a$.

The receptacle or chamber B is formed of carbon and has at its upper and lower ends lugs or projections $b\ b$, which abut against the electrode A, india-rubber bands $b'\ b'$ being employed for holding it against said electrode. The upper and lower ends of said vessel or receptacle are closed by plugs or stoppers $b^2\ b^2$ of rosin or the like. The vessel or receptacle B is sufficiently porous or permeable to enable the electrolyte to penetrate into its interior with the freedom required, a space or recess $b^3$ being provided between the electrode and the vessel or receptacle to enable the latter to present as large a surface as possible to the electrolyte.

Although I have described my improved cell as having only a single receptacle B, connected to the electrode A, it is obvious that I may, if desired, employ two or even more such receptacles.

What I claim, and desire to secure by Letters Patent of the United States, is—

1. In an electric cell the combination with an electrode of a receptacle containing depolarizing material and connected directly to said electrode but having a recess on the side adjacent to the electrode, said recess being freely open to the electrolyte, and means for detachably securing said receptacle to the electrode, substantially as described.

2. In an electric cell the combination with an electrode, of a terminal connected directly to the electrode, a permeable receptacle composed of the same or a similar material to that of the electrode, depolarizing material in said receptacle, and elastic bands for detachably securing said receptacle to the electrode, substantially as described.

3. In an electric cell the combination with the carbon electrode of a porous carbon receptacle, depolarizing material in said receptacle, and elastic bands adapted to detachably secure said receptacle to the electrode, substantially as described.

4. In an electric cell, the combination with the carbon electrode of a porous carbon receptacle, lugs on said receptacle adapted to abut against the electrode, a filling of depolarizing material in said receptacle and elastic bands for detachably securing said receptacle to said electrode, substantially as described.

In testimony whereof I have hereunto set my hand, in presence of two subscribing witnesses, this 8th day of April, 1902.

ERNEST AUGUSTE GEORGE STREET.

Witnesses:
ENRIQUE BAER,
EDWARD P. MACLEAN.